US010379382B2

(12) United States Patent
Liu et al.

(10) Patent No.: US 10,379,382 B2
(45) Date of Patent: Aug. 13, 2019

(54) SPECTACLE OPHTHALMIC LENS INTENDED TO BE MOUNTED ON A SPECTACLE FRAME

(71) Applicant: ESSILOR INTERNATIONAL, Charenton-le-Pont (FR)

(72) Inventors: Yu Richard Liu, Charenton-le-Pont (FR); Diana Chandra, Charenton-le-Pont (FR); Pauline Colas, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 15/540,395

(22) PCT Filed: Dec. 30, 2015

(86) PCT No.: PCT/EP2015/081456
§ 371 (c)(1),
(2) Date: Jun. 28, 2017

(87) PCT Pub. No.: WO2016/107919
PCT Pub. Date: Jul. 7, 2016

(65) Prior Publication Data
US 2018/0004011 A1 Jan. 4, 2018

(30) Foreign Application Priority Data
Dec. 31, 2014 (EP) ..................... 14307228

(51) Int. Cl.
*G02C 7/06* (2006.01)
*G02C 7/02* (2006.01)

(52) U.S. Cl.
CPC ............. *G02C 7/066* (2013.01); *G02C 7/027* (2013.01)

(58) Field of Classification Search
CPC . G02C 7/02; G02C 7/024; G02C 7/06; G02C 7/061; G02C 7/066; G02C 7/027
USPC ........... 351/159.01, 159.41, 159.42, 159.43, 351/159.71, 159.72, 759.75
See application file for complete search history.

(56) References Cited

U.S. PATENT DOCUMENTS 6,832,834 B2 12/2004 Haimerl et al.
2012/0105800 A1* 5/2012 Allione ................. G02C 7/027
351/159.74
2014/0176901 A1 6/2014 Espinola Estepa et al.

OTHER PUBLICATIONS

International Search Report and Written Opinion dated Mar. 9, 2016 in PCT/EP2015/081456 filed Dec. 30, 2015.

* cited by examiner

*Primary Examiner* — Darryl J Collins
(74) *Attorney, Agent, or Firm* — Oblon, McClelland, Maier & Neustadt, L.L.P.

(57) ABSTRACT

A spectacle ophthalmic lens mountable on a spectacle frame, the ophthalmic lens including: a fitting cross where the optical power is negative; a first zone extending in a temporal side of the fitting cross, wherein in the first zone when the ophthalmic lens is mounted on the spectacle frame, the optical power increases when a gazing direction moves towards the temporal side, and wherein over a nasal side of the fitting cross, the optical power of the ophthalmic lens is substantially same as at the fitting cross.

20 Claims, 6 Drawing Sheets

SPECTACLE OPHTHALMIC LENS INTENDED TO BE MOUNTED ON A SPECTACLE FRAME

FIELD OF THE INVENTION

The invention relates to a spectacle ophthalmic lens intended to be mounted on a frame, in particular for myopic people and to a method for determining such ophthalmic lens.

BACKGROUND OF THE INVENTION

There are more and more myopic people worldwide, especially in Asia in particular in Chinese population, where myopia is the dominating vision problem. Some myopic people will not wear spectacle lens, in particular for aesthetics issues.

Indeed, negative lenses, especially for high myopia wearers present various aesthetics issues.

First, an image jump at the temporal side of the wearer is easily observable by a person facing the wearer which makes the eyes of the wearer look unnatural. With increasing power, this effect becomes stronger and the person facing the wearer sees a more discontinued image of the wearer's face.

Secondly, with increasing power of negative lenses, the thickness of the edge of the ophthalmic lenses increases. In addition to safety and comfort issues in particular due to the weight of the ophthalmic lenses, the lenses produce a visual effect commonly referred to as the "bottom of a bottle", and this has been perceived as not beautiful for long time.

Thirdly, high myopic wearer has limited choices of spectacle frames. In order to reduce the edge thickness of the ophthalmic lens the wearer is to choose small spectacle frames in particular the width, of the spectacle frame should be limited.

Fourthly, for a person facing the wearer, the wearer's eyes may look smaller behind the negative ophthalmic lenses than the actual size and generally the higher the power, the smaller the eyes are perceived. This appears to be the strongest reason for Chinese women to avoid wearing ophthalmic spectacles lens, as "big eye" is really an essential part of Chinese definition of beauty.

Fifthly, for a person looking at the temporal side of a short-sighted prescription lens of a wearer, at a not nil viewing angle in respect with the primary line of vision of the wearer, image reflections in the lens, called "Myopic rings" or "Myopic circles", are observable. The higher the viewing angle is, the bigger the size of observable image reflections is.

Therefore, there is a need for an ophthalmic lens adapted for myopia wearer that improves the aesthetics aspects mentioned here above.

SUMMARY OF THE INVENTION

To this end, the invention proposes a spectacle ophthalmic lens, for example intended to be mounted on a spectacle frame, the ophthalmic lens comprising in wearing conditions:
a fitting cross where the optical power is negative,
a first zone extending in the temporal side of the lens wherein in the first zone the optical power increases when moving towards the temporal side, and wherein over the nasal side of the lens, the optical power of the ophthalmic lens is substantially the same as at the fitting cross.

Advantageously, having the optical power increases in the temporal side of the ophthalmic lens reduces the image jump issue. The increase of optical power in the temporal side further allows reducing the thickness of the ophthalmic lens in the temporal side and therefore allows the wearer to select larger spectacle frames.

Finally, reducing the optical power on the temporal side of the ophthalmic lens makes the eyes perceived less small compared to "standard" negative power ophthalmic lens and reduces the perception of myopic rings for a person looking at the temporal side of the lens of the wearer.

According to further embodiments which can be considered alone or in combination:
the first zone the astigmatism amplitude increases when moving towards the temporal side; and/or
the first zone comprises a corridor where the astigmatism amplitude is smaller than 0.25 Diopter wherein the fitting cross is located within; and/or
the ophthalmic lens comprises a front and a rear face, one of which has a spherical or torical surface and the other a progressive addition surface; and/or
the ophthalmic lens comprises at least a first area of stabilized optical power where the value of optical power does not deviate by more than +/−0.120 Diopter from the value at the fitting cross and wherein said first area corresponds to an area of the object-side surface extending of at least 3 mm in all directions from the fitting cross; and/or
the first zone is located in the temporal side of the ophthalmic lens and is separated horizontally from the fitting cross by a distance equal or greater than 3 mm, preferably equal or greater than 10 mm; and/or
the absolute value of the addition in the horizontal first zone is smaller than or equal to the absolute value of the optical power at the fitting cross of the ophthalmic lens.

According to a further aspect, the invention relates to a method for determining a spectacle ophthalmic lens, for example intended to be mounted to a spectacle frame, and adapted for a wearer, the method comprising:
a wearer data providing step during which wearer data comprising at least the wearer's ophthalmic prescription are provided,
a first surface providing step during which a first surface is provided,
a second surface providing step during which a second surface is provided,
a positioning step during which the relative position of the first and second surfaces is determined so to form an ophthalmic lens having an fitting cross with a negative optical power corresponding to the wearer's ophthalmic prescription, a horizontal first zone extending in the temporal side of the lens, wherein in the first zone the optical power increases when moving towards the temporal side and wherein over the nasal side of the lens the optical power is substantially the same as at the fitting cross,
wherein at least one of the first and second surface is a progressive addition surface.

According to further embodiments which can be considered alone or in combination:
during the positioning step the location of the first zone and/or the amount of optical power increase is/are determined in accordance to wearer's preference; and/or
the first and second surfaces are arranged so that the prismatic power of the ophthalmic lens, at the fitting cross is substantially equal to zero; and/or the first surface is a progressive addition surface and the second surface is a spherical surface; and/or during the positioning step the first surface is positioned so that in the first zone when the ophthalmic lens is mounted on the spectacle frame, the astigmatism amplitude increases when the gazing direction is moved towards the temporal side; and/or during the positioning step the first surface is positioned so that the ophthalmic lens comprises a corridor where the astigmatism amplitude is smaller than 0.25 Diopter wherein said corridor is substantially aligned with the horizontal gazing direction of the ophthalmic lens; and/or during the positioning step the first surface is positioned so that it comprises at least a first area of stabilized optical power where the value of optical power does not deviate by more than +/−0.120 Diopter from the value at the fitting cross and wherein said first area corresponds to an area of the object-side surface extending of a least 3 mm in all directions from the fitting cross; and/or during the positioning step the first surface is positioned so that the first zone is located in the temporal side of the ophthalmic lens and is separated horizontally from the fitting cross by a distance equal or greater than 3 mm, preferably equal or greater than 10 mm; and/or during the first surface providing step the first surface is selected so that the absolute value of the addition is smaller than or equal to the absolute value of the optical power of the wearer's ophthalmic prescription.

The invention further relates to an ophthalmic lens manufacturing method comprising:

an ophthalmic lens determining step during which an ophthalmic is determined using a determining method according to the invention, and an ophthalmic lens manufacturing step during which the determined ophthalmic lens is manufactured.

The invention further relates to a computer program product comprising one or more stored sequences of instructions that are accessible to a processor and which, when executed by the processor, causes the processor to carry out the steps of the methods according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Figure 1:
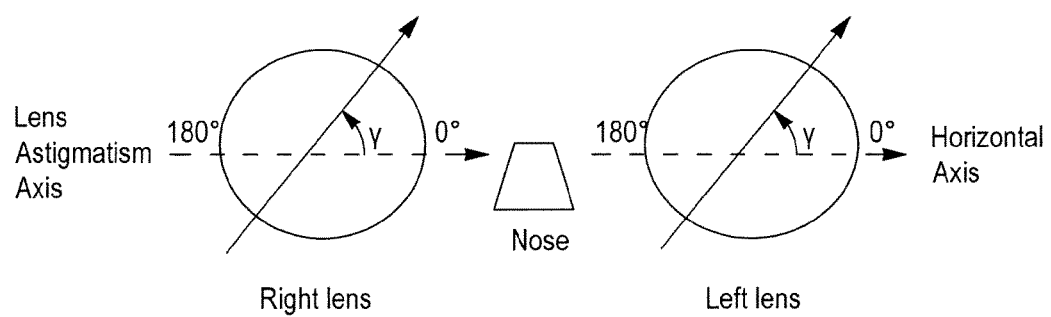
FIG. 1 illustrates the astigmatism axis γ of a lens in the TABO convention.

In the sense of the invention, the dioptric function corresponds to the optical lens power, for example mean power, or astigmatism, as a function of the gaze direction.

The wording "optical design" is a widely used wording known from the man skilled in the art in ophthalmic domain to designate the set of parameters allowing to define a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:

a power profile along the main gaze directions, called the meridian line, used by the lens wearer during day life activities, distributions of powers, for instance mean power, or astigmatism, on the sides of the lens, that is to say away from the main gaze direction.

These optical characteristics are part of the "designs" defined and calculated by ophthalmic lens designers and that are provided with the progressive lenses.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1) * CURV_{min} = \frac{n-1}{R_{max}} \text{ and}$$

$$SPH_{max} = (n-1) * CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n) * CURV_{min} = \frac{1-n}{R_{max}} \text{ and}$$

$$SPH_{max} = (1-n) * CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \tfrac{1}{2}(SPH_{min} + SPH_{max})$$

The expression of the mean sphere therefore depends on the surface considered:

if the surface is the object side surface $$SPH_{mean} = \frac{n-1}{2}\left(\frac{1}{R_{min}} + \frac{1}{R_{max}}\right)$$

if the surface is an eyeball side surface $$SPH_{mean} = \frac{1-n}{2}\left(\frac{1}{R_{min}} + \frac{1}{R_{max}}\right)$$

a cylinder CYL is also defined by the formula $CYL = |SPH_{max} - SPH_{min}|$.

The characteristics of any aspherical face of the lens may be expressed by the local mean spheres and cylinders. A surface can be considered as locally aspherical when the cylinder is at least 0.25 Diopters.

Figure 2:
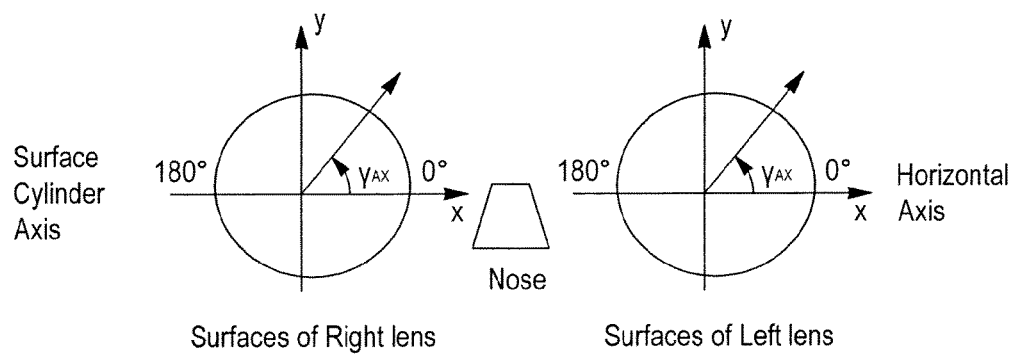
FIG. 2 illustrates the cylinder axis γAX in a convention used to characterize an aspherical surface.

For an aspherical surface, a local cylinder axis $\gamma_{AX}$ may further be defined. FIG. 1 illustrates the astigmatism axis $\gamma$ as defined in the TABO convention and FIG. 2 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal, the angle of this reference axis being 0°, and the sense of rotation is counterclockwise for each eye, when looking at the wearer ($0° \leq \gamma_{AX} \leq 180°$). An axis value for the cylinder axis $\gamma_{AX}$ of ±45° therefore represents an axis oriented obliquely, which when looking at the wearer, extends from the quadrant located up on the right to the quadrant located down on the left.

Moreover, a progressive lens may also be defined by optical characteristics, taking into consideration the situation of the person wearing the lenses.

Figure 3:
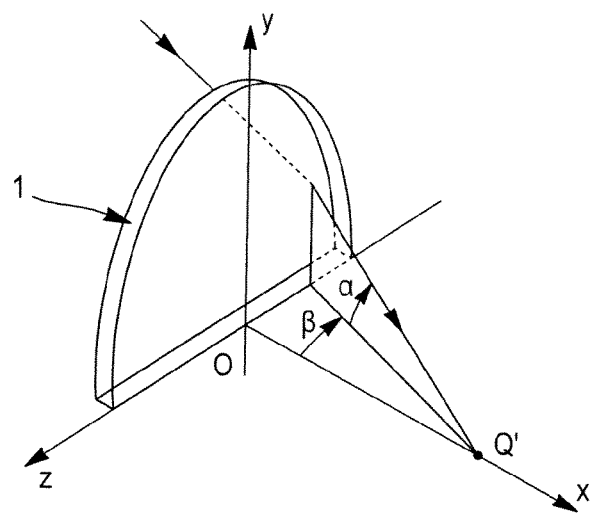
FIGS. 3 and 4 show, diagrammatically, optical systems of eye and lens.
Figure 4:
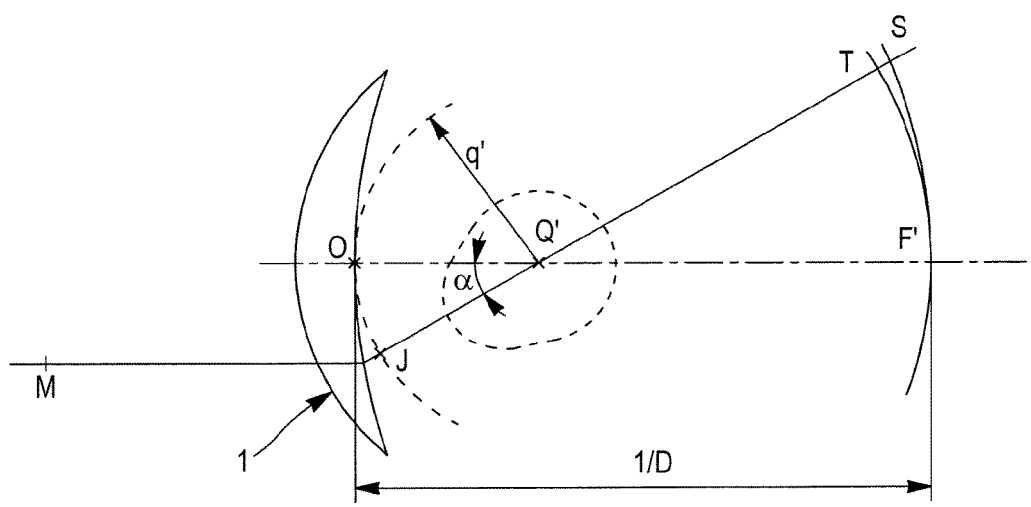

FIGS. 3 and 4 are diagrammatic illustrations of optical systems of eye and lens 1, thus showing the definitions used in the description. More precisely, FIG. 3 represents a perspective view of such a system illustrating parameters α and β used to define a gaze direction. FIG. 4 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 4 in a dot-dash line, is the horizontal axis passing through the center of rotation of the eye and extending in front of the wearer—that is the axis Q'F' corresponding to the primary gaze view. This axis cuts the aspherical surface of the lens 1 on a point called the fitting cross, which is present on lenses to enable the positioning of lenses in a frame by an optician. The point of intersection of the rear surface of the lens and the axis Q'F' is the point O.

O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

The fitting cross on the lens may be physically represented with a non permanent marking, or determined from permanent engraving, for example as being the center of two micro-circle engraving horizontally spaced by 34 mm. It can also be determined on the lens, in particular on single vision lens, as the point for which prismatic deviation is zero.

A given gaze direction—represented by a solid line on FIG. 4—corresponds to a position of the eye in rotation around Q' and to a point J of the apex sphere; the angle $\beta$ is the angle formed between the axis Q'F' and the projection of the straight line Q'J on the horizontal plane comprising the axis Q'F'; this angle appears on the scheme on FIG. 4. The angle $\alpha$ is the angle formed between the axis Q'J and the projection of the straight line Q'J on the horizontal plane comprising the axis Q'F'; this angle appears on the scheme on FIG. 4. A given gaze view thus corresponds to a point J of the apex sphere or to a couple $(\alpha,\beta)$. The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle $\alpha$ of the order of 35° and to an angle $\beta$ of the order of 5° in absolute value toward the nasal side, the object distance is of the order of 30 to 50 cm. For more details concerning a possible definition of an ergorama, US patent U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction $(\alpha,\beta)$. An object proximity ProxO is defined for the point M on the corresponding light ray in the object space as the inverse of the distance MJ between point M and point J of the apex sphere:

ProxO=1/MJ

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction $(\alpha,\beta)$, the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

Pui=ProxO+ProxI

With the same notations, an astigmatism Ast is defined for every gaze direction and for a given object proximity as $$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle $\gamma$. The angle $\gamma$ is measured in the frame $\{Q', x_m, y_m, z_m\}$ linked to the eye. It corresponds to the angle with which the image S or T i formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

The wearing conditions are to be understood as the position of the ophthalmic lens with relation to the eye of a wearer, for example defined by a pantoscopic angle, a cornea to lens distance, a pupil to cornea distance, a center of rotation of the eye to pupil distance, a center of rotation of the eye to lens distance and a wrap angle.

The cornea to lens distance is the distance along the visual axis of the eye of the wearer in the primary position (usually taken to be the horizontal) between the cornea and the back surface of the lens, for instance O in FIG. 4; for example equal to 12 mm.

The pupil to cornea distance is the distance between the pupil and the cornea of an eye of the wearer; usually equal to 2 mm.

The center of rotation of the eye to pupil distance is the distance along the visual axis of the eye between the center of rotation of the eye Q' and the cornea; for example equal to 11.5 mm.

The center of rotation of the eye to lens distance is the distance along the visual axis of the eye in the primary position (usually taken to be the horizontal) between the center of rotation of the eye Q' and the back surface of the lens, for instance O in FIG. 4, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

Figure 5:
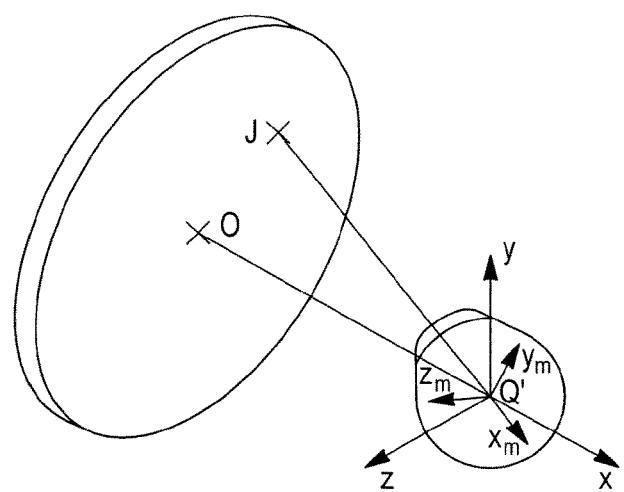
FIG. 5 shows a ray tracing from the center of rotation of the eye.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 5°. FIG. 5 represents a perspective view of a configuration wherein the parameters α and β are non zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is oriented from the lens toward the eye. The y axis is vertical and oriented upwardly. The z axis is such that the frame {x, y, z} be orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'.

The values in optic terms can be expressed for gaze directions. Gaze directions are usually given by their degree of lowering and azimuth in a frame whose origin is the center of rotation of the eye. When the lens is mounted in front of the eye, the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 3-5 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0° Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame, and preferably to a value along the y axis inferior to the y_value at the fitting cross.

Figure 6:
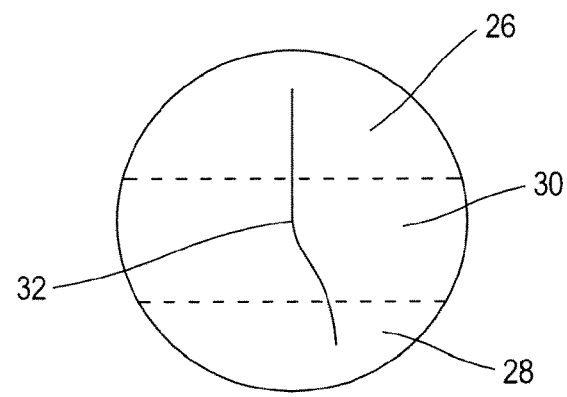
FIGS. 6 and 7 show field vision zones of a lens.
Figure 7:
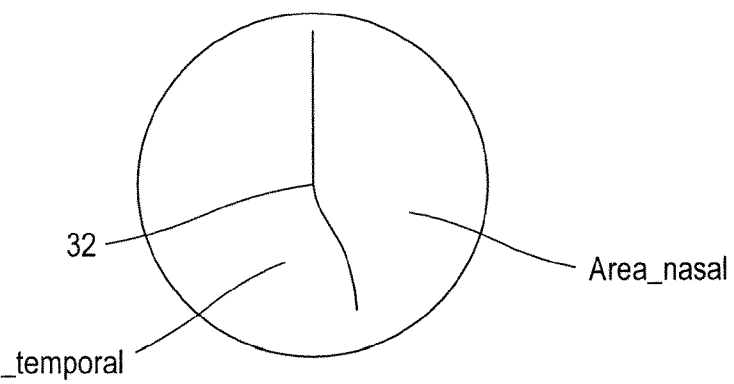

The visual field zones seen through a lens are schematically illustrated in FIGS. 6 and 7. The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side.

For the purpose of the invention, the meridian line 32 of a progressive lens is defined as follow: for each lowering of the view of an angle α=$α_1$ between the gaze direction corresponding to the fitting cross and a gaze direction being in the near vision zone, the gaze direction ($α_1$, $β_1$) is searched for which the local residual astigmatism is minimum. Thus, all the gaze directions defined in that way form the meridian line of the ergorama-eye-lens system. The meridian line of the lens represents the locus of mean gaze directions of a wearer when he is looking from far to near visions. The meridian line 32 of a surface of the lens is defined as follows: each gaze direction (α, β) belonging to the optical meridian line of the lens intersects the surface at a point (x, y). The meridian line of the surface is the set of points corresponding to the gaze directions of the meridian line of the lens.

As shown in FIG. 7, the meridian 32 separates the lens into a nasal area and a temporal area. As expected, the nasal area is the area of the lens which is between the meridian and the nose of the wearer whereas the temporal area is the area which is between the meridian and the temple of the wearer. The nasal area is labeled Area_nasal and the temporal area is labeled Area_temporal, as it will in the remainder of the description.

When the lens is a single vision lens, it is also possible to define a "nasal area" as the area located between the nose of the wearer and a vertical meridian of the lens crossing the fitting cross, and a temporal area as the area located between the temple of the wearer and the vertical meridian of the lens.

The spectacle ophthalmic lens according to the invention are provided with an indication of the temporal and nasal side of the lens. For example, the lenses are edged to fit a specific spectacle frame and/or an indication such as reference marking, is provided to have the skilled person identify the right and left lens, the vertical meridian and an orientation.

The invention relates to a spectacle ophthalmic lens, for example intended to be mounted on a spectacle frame. The ophthalmic lens is adapted for a myopia wearer, in particular the optical power at the fitting cross is negative.

The optical power over the nasal side of the fitting cross of the ophthalmic lens is substantially the same as at the fitting cross.

The temporal side of the fitting cross comprises a first zone wherein the optical power increases from the part said first zone the closest from the fitting cross to the part of said first zone the closest to the temporal edge of the ophthalmic lens.

In other words, when the ophthalmic lens is mounted on the spectacle frame, the optical power increases when the gazing direction moves towards the temporal side.

Figure 8:
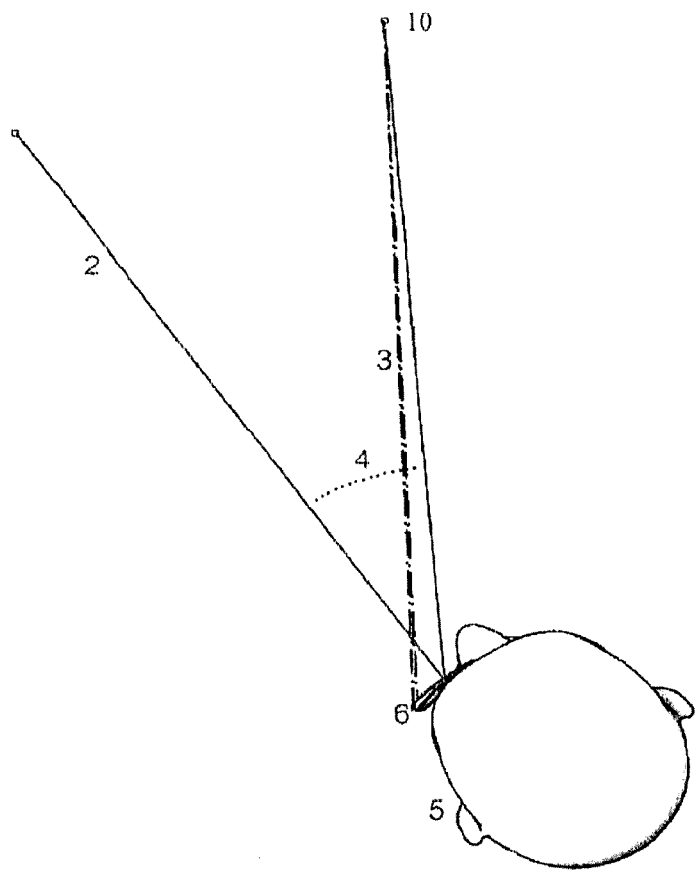
FIG. 8 illustrates an angle of view relative to a lens of a wearer for viewing myopic rings.
Figure 9:
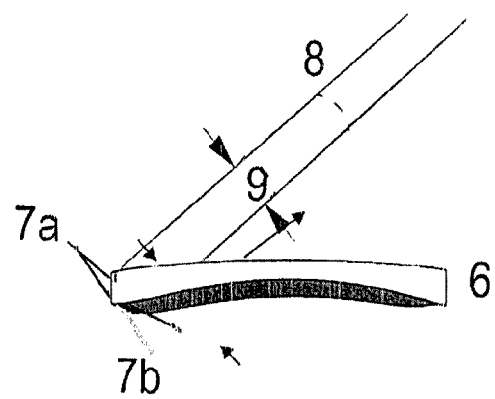
FIG. 9 shows an enlarged view of the lens illustrated in FIG. 8.

As illustrated in FIG. 8, a wearer 5 having a lens 6 is represented. The lens 6 may be mounted in a frame (not represented). The lens is preferably a short-sighted prescription lens.

An observer 10, looking at the face of the wearer 5, and more precisely at the temporal side of the lens 6 of the wearer, is disposed at a position such that a non-nil angle 4 appears between the gaze direction of the eye of the observer 10 and the primary line of vision 2 of the wearer. Here, the primary line of vision 2 of the wearer is defined as the line passing through the center of rotation of the eye of the wearer and the fitting cross of the lens.

Figure 10:
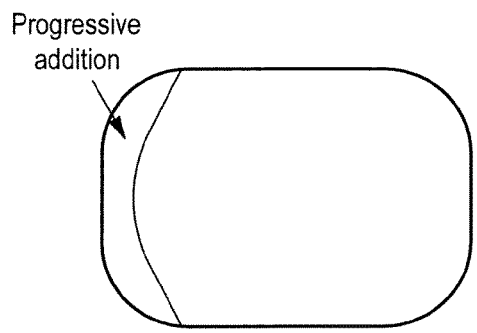
FIG. 10 is a schematic representation of an ophthalmic lens according to the invention.

As illustrated in FIG. 11 representing an enlarged view of the lens 6 of FIG. 10, the light strikes the rear surface 7b of the lens at an oblique angle such that the light is reflected off the rear surface 7b of the lens and crosses the front surface of the lens. Such phenomenon is called "Myopic rings" or "Myopic circles", see for instance Daniel A. Winters, "Master in ophthalmic Optics certification of the American Board Opticianry", August 1996. More precisely, the light rays coming from the back of the lens 7b and from the edge of the lens 7a create the myopic rings images seen by the observer corresponding to the ray beam 9. The myopic rings images size is represented by the angle 8 formed by the extreme rays of the beam 9. The higher the viewing angle is, the bigger the size of observable image reflections is.

As represented schematically on FIG. 10, the principal of the proposed solution is to add a progressive addition to the temporal side of a negative optical power lens, so as to provide reduced negative power at the temporal edge of the ophthalmic lens.

Advantageously, by reducing the negative optical power at the temporal edge of the ophthalmic lens, the jump image effect and the thickness of the ophthalmic lens are reduced, hence the "bottom of a bottle" effect is reduced.

According to an embodiment of the invention, the ophthalmic lens according to the invention is arranged so that when said ophthalmic lens is mounted on the spectacle frame the astigmatism amplitude increases when the gazing direction moves towards the temporal side. In particular, the astigmatism amplitude increases from the part the first zone the closest from the fitting cross to the part of said first zone the closest to the temporal edge of the ophthalmic lens Alternatively, the first zone may comprise a corridor where the astigmatism amplitude is smaller than 0.25 Diopter.

Preferably, the positioning of the progressive lens is such that the corridor wherein the unwanted astigmatism is smaller than 0.25 Diopter is horizontal, and is aligned with the horizontal gazing direction. For example, the corridor may be horizontal and aligned with the fitting cross.

The lens in the FIG. 10 has the contour shape of the spectacle frame. This contour shape may be obtained from a circular lens that is then edged, using any edger device. The lens surface may include non permanent marking, such as ink marking, or permanent marking such as engraving, that will be used to identify the position of the temporal zone in the lens. For example, an horizontal marking is used to define the horizontal axis of the lens, whereas a specific marking is on the right (resp. left) of the fitting cross to indicate that the temporal zone is on the right (resp. left) part of the lens.

Figure 11A:
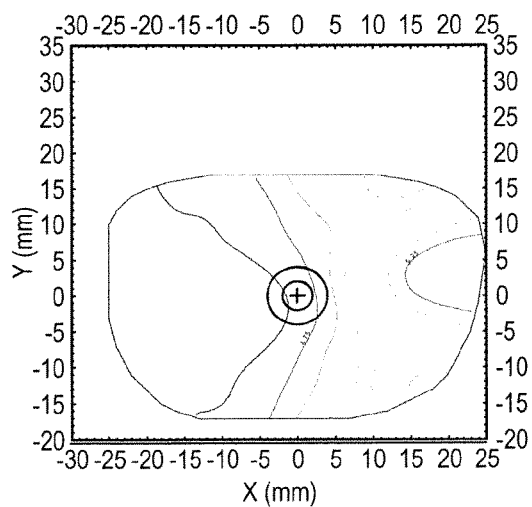
FIGS. 11a and 11b are sphere and cylinder maps of an ophthalmic lens according to the invention.
Figure 11B:
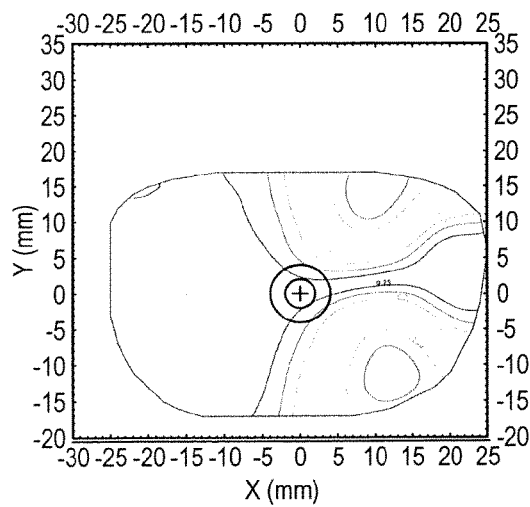

Such embodiment is illustrated by a sphere map on FIG. 11a and a cylinder map on FIG. 11b.

Advantageously, when the wearer looks trough the temporal side of the ophthalmic lens, only the spherical power changes, and so the wearer experiments less distortion caused by unwanted astigmatism.

So as to assure good optical quality and visual comfort for the wearer, the ophthalmic lens of the invention may comprise at least a first effective zone of stabilized optical power where the value of optical power does not deviate by more than +/−0.120 Diopter from the value at the fitting cross.

Preferably, said first effective zone corresponds to an area of the object-side surface extending of at least 3 mm in all directions from the fitting cross when the ophthalmic lens is mounted on the spectacle frame.

So as to reduce the impact of the design of the ophthalmic lens according to the invention on the visual comfort of the wearer, the first zone may be located in the temporal side of the ophthalmic lens and is separated horizontally from the fitting cross by a distance equal or greater than 3 mm, preferably equal or greater than 10 mm.

According to an embodiment of the invention, the absolute value of the addition in the first zone is smaller than or equal to the absolute value of the optical power at the fitting cross of the ophthalmic lens. Having the addition as close as possible to the absolute value of the prescription makes the temporal side of the lens close to a plano lens, so with almost no temporal jump.

Typically, one of the faces of the ophthalmic lens has a spherical or torical surface and the other a progressive addition surface.

Advantageously, an ophthalmic lens according to the invention may be obtain by using existing progressive ophthalmic lens designs and by having the near vision zone of the initial progressive design placed in the temporal side of the ophthalmic lens.

For example, the inventors have compared a single vision ophthalmic lens with a prescription of −8.00 Diopters with two ophthalmic lens according to the invention.

The first ophthalmic lens according to the invention corresponds to the initial single vision lens to which a Physio® progressive design of +0.6 D of addition is added.

The second ophthalmic lens according to the invention corresponds to the initial single vision lens to which a Physio® progressive design of +2.0 D of addition is added.

The inventors have observed a 5% reduction in image jump for the first ophthalmic lens according to the invention compared to the single vision lens and a 15% reduction for the second ophthalmic lens according to the invention.

Regarding the thickness at temporal side, when consider a frame contour with boxing size of A=55 mm and B=28 mm, the thickness reduction for the first ophthalmic lens according to the invention is of 5.3% and thickness reduction for the second ophthalmic lens according to the invention is of 13.3%.

In the above examples using Physio® progressive designs the fitting cross is overlapping with wearer's optical center. However, this is not compulsory.

In particular if the fitting cross is moved horizontally towards temporal side, the field of vision is enlarged while the benefit of reduction in jump image is reduced, and vice versa.

Advantageously, a lens according to an embodiment of the invention different from the lens as illustrated on FIGS. 11a and 11b may be obtained by using a surface characterized by a progression of sphere and cylinder from the fitting cross to the temporal side of the ophthalmic lens.

Figure 12A:
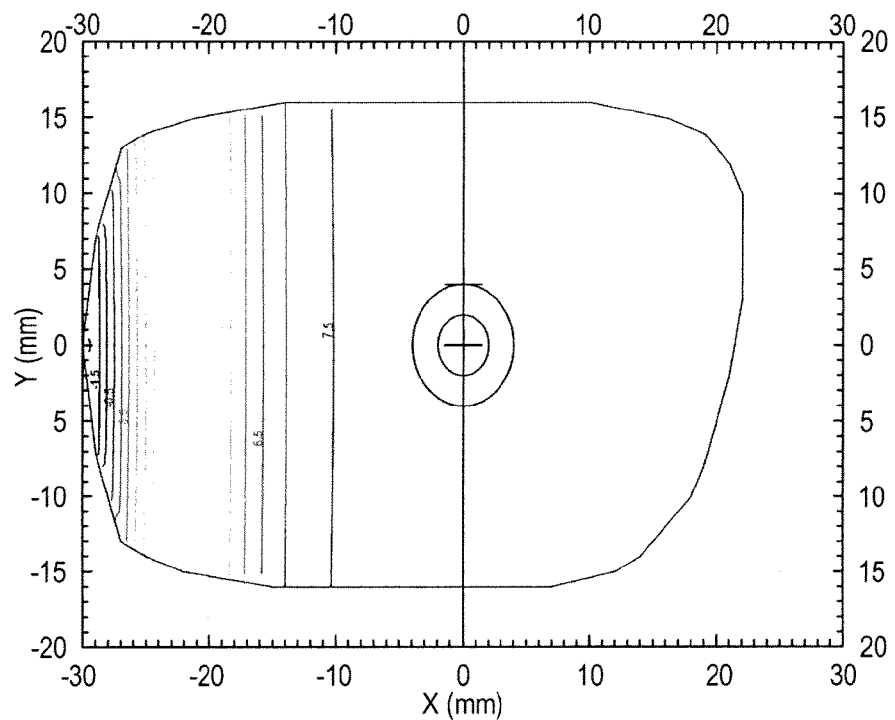
FIGS. 12a and 12b are sphere and cylinder maps of a rear surface of an ophthalmic lens according to the invention.
Figure 12B:
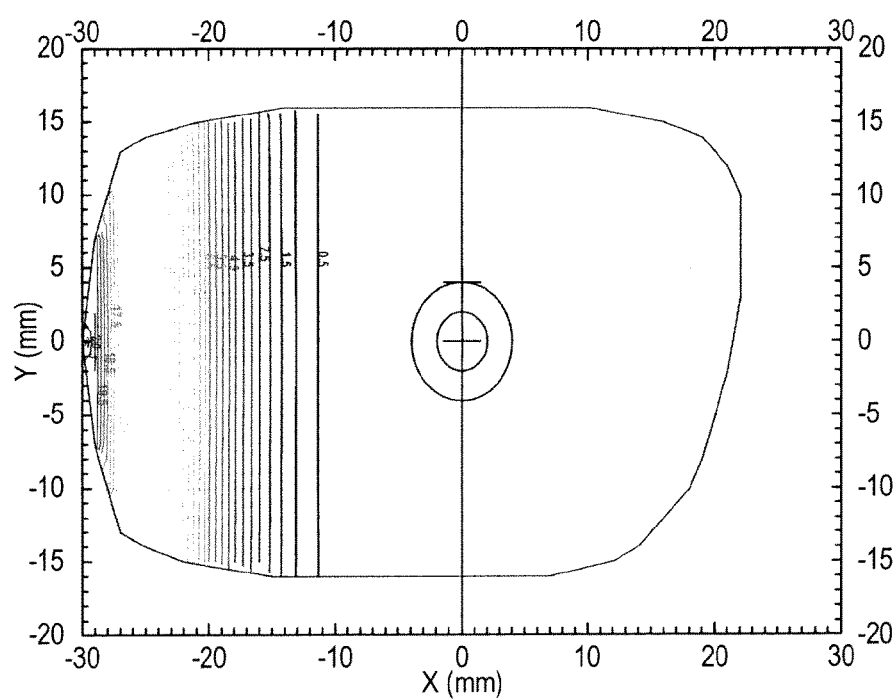

Said alternative embodiment is illustrated by a sphere map on FIG. 12a and a cylinder map on FIG. 12b of a back surface of a lens having a spherical front surface.

On FIG. 12a, the curvature of the back surface of the lens decreases along a horizontal direction from the fitting cross to the temporal side of the lens. As a result, the addition increases from the fitting cross to the temporal side and is as close as possible to the absolute value of the prescription at the temporal side.

Such configuration makes the temporal side of the lens very close to a nil power lens, also called "plano lens". In particular with such lens, there is almost no temporal jump.

Therefore, on the temporal side, the curvature of the back surface is reduced and the edge of the lens is thinner than on a classical single vision lens. Then, the size of myopic rings images seen by the observer is also reduced.

For example, the inventors have compared a classical single vision ophthalmic lens with a prescription of −6.00 Diopters with said alternative embodiment.

Said alternative embodiment may comprise a front face identical to the front face of the classical single vision lens but may comprise also a back surface having a progression of sphere and cylinder according to the FIGS. 12a and 12b.

The inventors have observed a 45% reduction in image jump for the ophthalmic lens according to the invention compared to the classical single vision ophthalmic lens.

Regarding the thickness at temporal side, when considering a frame contour with boxing size of A=55 mm and B=34 mm, the thickness reduction for the ophthalmic lens according to the invention is of 21%.

Regarding the image size of the myopic rings, when considering an observer placed at a position with an angle equals 30 degrees, the size of the myopic rings image is reduced by 82%.

Figure 13:
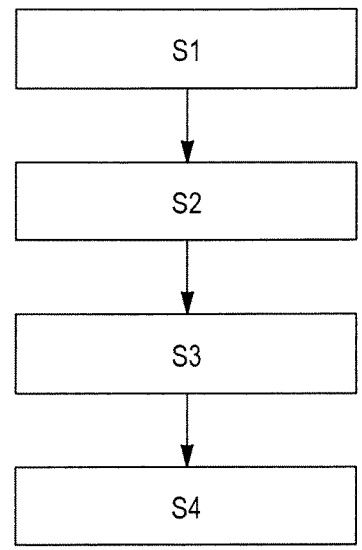
FIG. 13 is an illustration of a chart-flow of an embodiment of the method according to the invention.

The invention further relates to a method for determining an ophthalmic lens intended to be mounted to a spectacle frame and adapted for a wearer. FIG. 13 illustrates of a chart-flow of an embodiment of the method according to the invention. The method comprises:

a wearer data providing step S1,
a first surface providing step S2,
a second surface providing step S3, and
a positioning step.

During the wearer data providing step S1, wearer data comprising at least the wearer's ophthalmic prescription are provided. The wearer data may further comprise an indication of the wearer sensitivity to aesthetic issues and/or the wearer's tendency to move his head or his eyes when gazing at a target in the periphery of his field of vision.

Based on the wearer's sensitivity to aesthetic issues the lens provider may decide to add more or less optical power in the temporal side of the lens. For example, if the wearer attaches a great importance to aesthetic issues the lens provider may add greater optical power in the temporal side of the lens than if the wearer grants more importance to optical properties of the optical lens.

Furthermore, if a wearer that has a tendency to move his eyes to gaze at a peripheral target uses more the peripheral parts of the ophthalmic lens then a wearer that moves his head. Therefore, the lens provider may add more optical power in the temporal side of the lens for "head movers" than for "eye movers".

The wearer data may further comprise and indication of the spectacle frame selected by the wearer. Based on the shape of the spectacle frame, the optical power to be added to the temporal side may be adjusted, for example to reduce the temporal jump effect the absolute value of the addition at the temporal side of the edged ophthalmic lens may be chosen equal to the optical power of the wearer's ophthalmic prescription.

A first optical surface is provided during the first surface providing step S2.

A second optical surface is provided during the second surface providing step S3.

According to a preferred embodiment, the first optical surface is a progressive surface and the second optical surface is a spherical surface.

The relative position of the first and second surfaces is determined so to form an ophthalmic lens having a fitting cross with a negative optical power corresponding to the wearer's ophthalmic prescription. The first and second surfaces are further positioned so that the ophthalmic lens has a horizontal first zone wherein the optical power increases from the part said first zone the closest from the fitting cross to the part of said first zone the closest to the temporal edge of the ophthalmic lens.

The progressive addition surface, for example the first surface, may correspond to an existing design making the implementation of the method of the invention easier.

During the positioning step the first surface may be positioned so that in the first zone when the ophthalmic lens is mounted on the spectacle frame, the astigmatism amplitude increases when the gazing direction is moved towards the temporal side.

The first optical surface provided during the first surface providing step may be a progressive addition surface comprising a corridor where the astigmatism amplitude is smaller than 0.25 Diopter. To increase optical comfort of the wearer, during the positioning step the first surface is positioned so that said corridor is substantially aligned with the horizontal gazing direction of the ophthalmic lens when mounted on the spectacle frame.

To assure good optical comfort, the first optical surface may comprise at least a first effective zone of stabilized optical power where the value of the addition is smaller than or equal to +/−0.120 Diopter of at least 3 mm of diameter. The second optical surface is a spherical surface corresponding to the wearer's ophthalmic prescription. During the positioning step the first and second optical surface are positioned so that the a first effective zone is over the fitting cross, and extends of a least 3 mm in all directions from the fitting cross.

So as to reduce optical disturbance of the wearer, during the positioning step the first surface is positioned so that the first zone is located in the temporal side of the ophthalmic lens and is separated horizontally from the fitting cross by a distance greater than or equal to 3 mm, preferably greater than or equal to 10 mm.

During the first surface providing step the first surface is selected so that the absolute value of the addition is smaller than or equal to the absolute value of the optical power of the wearer's ophthalmic prescription. The closest the absolute value of the addition is to the optical power of the wearer's ophthalmic prescription the more the temporal jump effect is reduced. According to an embodiment, during the positioning step the location of the first zone and/or the amount of optical power increase is/are determined in accordance to wearer's preference. Typically, the wearer's preference may comprise an indication of the compromise the wearer wishes between aesthetic issues and optical quality issues.

According to an embodiment of the invention, the position of the first zone and/or the amount of optical power increase can be fully customized.

For example, some myopic wearer may prefer to choose different trade-off between aesthetical appearance linked to the image jump at the temporal side and the loss of visual performance linked to the difference between the wearer prescription and the optical power at the temporal side.

For this purpose, a simulation of the wear of the lenses using virtual reality techniques may provide a physically realistic visual simulation of the optical blur perceived by the wearer when wearing such lenses. Such a visual simulation may also illustrate the amount of temporal jump on the face of the wearer, by using a picture of the myopic wearer and ray tracing techniques to calculate the deformation of the temporal side of the wearer as perceived through the lens. This visual simulation may be included in an "on the shelf" virtual try-on (VTO) software.

The myopic wearer may then perform iterative adjustments of various parameters (eg. position of first zone, amount of optical power increase or various frame) and on the basis of the illustration provided by the simulation select what is the best trade-off set of parameters for complying his/her needs.

The method for manufacturing an ophthalmic lens according to the invention may comprise using existing progressive design, with a semi-finished lens. Such method may comprise:

- a semi-finished progressive lens providing step during which a progressive semi-finished lens having an addition power corresponding to the power needed to reduce the temporal jump is provided;
- a semi-finished positioning step during which the semi-finished lens is positioned so that the meridian line is 90° instead of 0°, and so that the meridian line crosses the line of sight when the optical lens is mounted and the wearer looks straight away;
- a horizontal positioning step during which the horizontal positioning of the meridian line is determined so that the progression starts in the temporal side;
- a rear surface processing step during which the rear surface of the semi-finished lens is processed so that the optical power of the lens is equal to the ophthalmic prescription of the wearer and so that the prismatic power is zero at the pupil position for far vision.

Alternatively, the ophthalmic lens can also be realized using a progressive design for which the progressive surface is on the back surface, or for which both surfaces are progressive. Digital surfacing may be used to realize such lens.

The invention has been described above with the aid of embodiments without limitation of the general inventive concept. In particular although the invention has been described using at least one progressive addition surface, the invention may be implemented with a bifocal lens.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A spectacle ophthalmic lens mountable in a spectacle frame, the ophthalmic lens comprising, in wearing conditions:
    a fitting cross where optical power is negative;
    a temporal side;
    a nasal side; and
    a first zone extending in a temporal side of the lens,
    wherein, in the first zone, the optical power increases from a part of said first zone closest from the fitting cross to a part of said first zone closest to a temporal edge of the ophthalmic lens when moving towards the temporal side, and
    wherein, over the nasal side of the lens, the optical power of the ophthalmic lens is substantially same as at the fitting cross.

2. The ophthalmic lens according to claim 1, wherein, in the first zone, astigmatism amplitude increases when moving towards the temporal side.

3. The ophthalmic lens according to claim 1, wherein the first zone comprises a corridor where astigmatism amplitude is smaller than 0.25 Diopter, and wherein the fitting cross is located within the corridor.

4. The ophthalmic lens according to claim 3, comprising at least a first area of stabilized optical power where a value of optical power does not deviate by more than +/−0.120 Diopter from a value at the fitting cross, wherein the first area corresponds to an area of an object-side surface extending of at least 3 mm in all directions from the fitting cross.

5. The ophthalmic lens according to claim 1, comprising a front and a rear face, one of which has a spherical or torical surface and the other a progressive addition surface.

6. The ophthalmic lens according to claim 1, wherein the first zone is located in the temporal side of the ophthalmic lens and is separated horizontally from the fitting cross by a distance equal or greater than 3 mm.

7. The ophthalmic lens according to claim 1, wherein an absolute value of addition in the horizontal first zone is smaller than or equal to an absolute value of the optical power at the fitting cross of the ophthalmic lens.

8. The ophthalmic lens according to claim 1, wherein the lens is divided into the nasal side and the temporal side by a meridian line through the fitting cross.

9. The ophthalmic lens according to claim 8, wherein the fitting cross is a reference point to position the lens in the spectacle frame.

10. A method for determining a spectacle ophthalmic lens adapted for a wearer, the method comprising:
    providing wearer data comprising at least a wearer's ophthalmic prescription;
    providing a first surface;
    providing a second surface;
    positioning a relative position of the first and second surfaces to form an ophthalmic lens including a fitting cross with a negative optical power corresponding to the wearer's ophthalmic prescription, a horizontal first zone extending in a temporal side of the lens,
    wherein in the first zone the optical power increases from a part of said first zone closest from the fitting cross to a part of said first zone closest to a temporal edge of the ophthalmic lens when moving towards the temporal side,
    wherein over a nasal side of the lens the optical power is substantially same as at the fitting cross; and
    wherein at least one of the first and second surface is a progressive addition surface.

11. The method according to claim 10, wherein during the positioning a location of the first zone and/or an amount of optical power increase is/are determined in accordance with the wearer's preference.

12. The method according to claim 11, wherein during the positioning the first surface is positioned so that in the first zone when the ophthalmic lens is mounted on a spectacle frame, astigmatism amplitude increases when a gazing direction is moved towards the temporal side.

13. The method according to claim 11, wherein during the positioning the first surface is positioned so that the ophthalmic lens comprises a corridor where astigmatism amplitude is smaller than 0.25 Diopter, and wherein the corridor is substantially aligned with a horizontal gazing direction of the ophthalmic lens when mounted on a spectacle frame.

14. The method according to claim 11, wherein during the positioning the first surface is positioned so that the first zone is located in the temporal side of the ophthalmic lens and is separated horizontally from the fitting cross by a distance equal or greater than 3 mm.

15. The method according to claim 11, wherein during the providing the first surface is selected so that an absolute value of addition is smaller than or equal to an absolute value of the optical power of the wearer's ophthalmic prescription.

16. The method according to claim 10, wherein the first and second surfaces are arranged so that prismatic power of the ophthalmic lens, at the fitting cross, is substantially equal to zero.

17. The method according to claim 10, wherein the first surface is a progressive addition surface and the second surface is a spherical surface.

18. The method according to claim 10, wherein the lens is divided into the nasal side and the temporal side by a meridian line through the fitting cross.

19. The method according to claim 18, wherein the fitting cross is a reference point to position the lens in a spectacle frame.

20. A spectacle ophthalmic lens mountable in a spectacle frame, the ophthalmic lens comprising, in wearing conditions:
- a fitting cross where optical power is negative;
- a temporal side;
- a nasal side; and
- a first zone extending in a temporal side of the lens,
- wherein, in the first zone, the optical power increases when moving towards the temporal side,
- wherein, over the nasal side of the lens, the optical power of the ophthalmic lens is substantially same as at the fitting cross, and
- wherein an absolute value of addition in the horizontal first zone is smaller than or equal to an absolute value of the optical power at the fitting cross of the ophthalmic lens.

* * * * *